United States Patent [19]

Mueller et al.

[11] 3,865,786

[45] Feb. 11, 1975

[54] MANGANOUS ORGANO PHOSPHONATE UV LIGHT ABSORBERS FOR POLYAMIDES

[75] Inventors: Helmut Mueller, Binningen; Paul Mosher, Basel; Helmut Linhart, Reinach, all of Switzerland

[73] Assignee: Ciba-Geigy Corporation, Ardsley, N.Y.

[22] Filed: Dec. 7, 1972

[21] Appl. No.: 312,998

Related U.S. Application Data

[62] Division of Ser. No. 188,996, Oct. 13, 1971, abandoned.

[30] Foreign Application Priority Data

Oct. 20, 1970  Switzerland...................... 15422/70

[52] U.S. Cl........................................ 260/45.75 R
[51] Int. Cl............................................. C08g 51/62

[58] Field of Search.................. 260/429 R, 45.75 R

[56] References Cited
UNITED STATES PATENTS

| | | | |
|---|---|---|---|
| 2,887,462 | 5/1959 | Van Oot.......................... | 260/45.75 |
| 3,189,630 | 6/1965 | Smutny........................... | 260/45.75 |
| 3,310,575 | 3/1967 | Spivack........................... | 260/45.75 |
| 3,488,368 | 1/1970 | Spivack........................... | 260/45.75 |
| 3,723,489 | 3/1973 | Dexter et al..................... | 260/45.75 |

*Primary Examiner*—V. P. Hoke
*Attorney, Agent, or Firm*—Nestor W. Shust

[57] ABSTRACT

New manganese (II) salts of monoester of dialkylhydroxybenzylphosphonic acids are stabilizers for polyamides. They are prepared by reacting the sodium salt of a monoester of a dialkylhydroxybenzylphosphonic acid with a manganese salt.

6 Claims, No Drawings

MANGANOUS ORGANO PHOSPHONATE UV LIGHT ABSORBERS FOR POLYAMIDES

This application is a division of copending application Ser. No. 188,996, filed Oct. 13, 1971, now abandoned.

The subject of the invention are new manganous salts of dialkylhydroxybenzylphosphonic acid half-esters, their manufacture, their use for protecting polyamides and, as an industrial product, the organic material protected by their aid against the harmful influence of light.

It is known to employ manganese salts as light stabilisers for polyamides, especially for polyamides which have been delustred with titanium dioxide. These salts are salts of the divalent manganese cation with anions of organic acids, for example acetate, oxalate, lactate or benzoate. They are added to the base material together with acids of phosphorus, either in the form of the corresponding sodium salts or as free acids or their esters, such as sodium hexametaphosphate, phosphorous acid, phenylphosphonic acid or their esters before, during or after the polymerisation or polycondensation. These light-stabilising mixtures however show the disadvantage that they can in part be eluted by aqueous media, which manifests itself above all after dyeing thin polymer structures, for example dyeing fibres in aqueous liquors, in a drop in the light-protection action. The same disadvantage is also shown by phosphorus-free polyamide fibres stabilised with manganese salts of organic acids, such as manganese acetate, alone.

It has now been found, surprisingly, that new compounds of the formula I

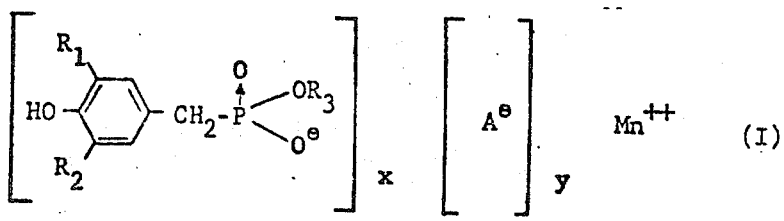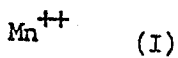

in which $R_1$ and $R_2$ independently of one another denote alkyl with 1 to 8 carbon atoms, and $R_1$ and $R_2$ together contain not more than 12 carbon atoms, A denotes the anion of an aliphatic carboxylic acid with 1 to 18 carbon atoms or of an aromatic carboxylic acid with 7 to 11 carbon atoms or denotes the chloride, bromide or iodide anion, $x$ denotes 1 or 2, $y$ denotes 0 or 1, with $x + y$ being 2, and $R_3$ denotes alkyl with 1 to 18 carbon atoms, are very good light stabilisers for polyamides.

Compared to the previously known manganese salts or their mixtures with phosphorus compounds, the compounds according to the invention show a distinctly improved action as light stabilisers and furthermore have the industrially desired advantage that aqueous media elute them to a substantially lesser extent from the polyamide. As compared to other previously known light protection agents for polyamides from the series of the salts or complexes of hydroxybenzylphosphonic acid half-esters with various other metal ions, they show a far better light protection effect and substantially more favourable colour properties.

$R_1$ and $R_2$ in the formula I denote, for example, methyl, iso-propyl, sec.-butyl, tert.-butyl, sec.-amyl, tert.-amyl or tert.-octyl.

Preferably, $R_1$ and $R_2$ are alkyl with 1 to 4 carbon atoms, such as methyl, iso-propyl, sec.-butyl and tert.-butyl.

Particularly preferred compounds of the formula I are those in which $R_1$ and $R_2$ denote tert.-butyl.

$R_3$ in the formula I denotes, for example, methyl, ethyl, propyl, butyl, pentyl, hexyl, octyl, iso-octyl, decyl, dodecyl, tetradecyl or octadecyl.

Methyl, ethyl, propyl, butyl or octyl are preferred as $R_3$.

Particularly preferred compounds of the formula I are those in which $R_3$ denotes methyl, ethyl or butyl.

The anion $A^-$ in the formula I can be the anion of an aliphatic carboxylic acid with 1 to 18 carbon atoms, for example the anion of formic acid, acetic acid, propionic acid, butyric acid, 2-ethyl-hexanoic acid, lauric acid or stearic acid.

The anion $A^-$ can however also be the anion of an aromatic carboxylic acid with 7 to 11 carbon atoms, for example the anion of benzoic acid, of a toluic acid, of phenylacetic acid or of butylbenzoic acid.

Anions of aliphatic carboxylic acids with 2 to 8 carbon atoms, for example the acetate ion, or anions of aromatic carboxylic acids with 7 or 8 carbon atoms, for example the benzoate ion, are preferred as $A^-$.

Possible base materials for the new compounds are polyamides and copolyamides which are obtained by polymerisation of diamines and dicarboxylic acids and/or of aminocarboxylic acids or of the corresponding lactams. The substrates can be in the form of filaments, bristles, films, injection-moulded articles and the like.

The compounds of the formula I are added to the base materials in an amount which corresponds to 1.0 to 500 ppm of manganese, relative to the base material. Manganese additions of 10 to 200 ppm, relative to the base material, are preferred, and additions of 10 to 70 ppm are particularly preferred.

The new compounds can be incorporated into the polyamides before, during or after the polycondensation, optionally conjointly with further additives. As such additives it is possible to use: pigments, mainly titanium dioxide in its two modifications rutile and anatase, in concentrations of 0.01–3.0%, but also coloured pigments such as cadmium sulphides, phthalocyanines and perylene pigments; chain regulators, for example acetic acid and benzoic acid; phenolic antioxidants or amine antioxidants, such as 1,3,5-trimethyl-2,4,6-tri-(3,5-di-tert.-butyl-4-hydroxy-benzyl)-benzene, pentaerythritol-[3-(4-hydroxy-3,5-di-tert.-butylphenyl)-propionic acid]-tetraester, 1,6-hexamethylene-[3-(4-hydroxy-3,5-di-tert.-butylphenyl)-propionic acid]-diamide, 4,4'-butylidene-bis-(3-methyl-6-tert.-butylphenol) and di-tert.-octyl-diphenylamine; UV-absorbers, which are preferably incorporated into the polymer after the polycondensation, for example 2-(2'-hydroxy-3',5'-di-tert.-amyl-phenyl)-lbenzotriazole and 2-(2'-hydroxy-5'-methyl-phenyl)-benzotriazole; further additives, such as anti-static agents and flame-proofing agents.

The new compounds can also be added to the finished polyamide before or during shaping, for example by sprinkling onto dried granules ("dry blending") or by applying a solution of the compounds according to the invention and, if appropriate, further additives, to the polyamide and subsequently evaporating the solvent.

Various processes are suitable for the manufacture of the compounds of the formula I. Thus, for example, 1 or 2 mols of a compound of the formula II

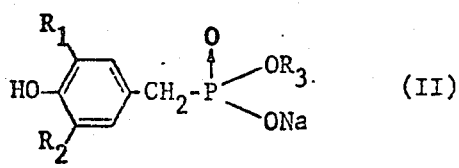

in which $R_1$, $R_2$ and $R_3$ have the meanings indicated under the formula I, can be reacted with 1 mol of a compound of the formula III

$$MnA_2 \quad (III)$$

wherein A has the meaning indicated under the formula I.

It is however also possible to react 2 mols of a phosphonic acid half-ester of the formula IIa

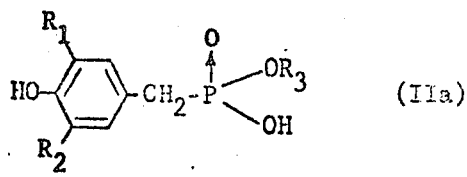

wherein $R_1$, $R_2$ and $R_3$ have the meanings indicated under the formula I, with 1 mol of manganous carbonate or manganous hydroxide.

Suitable solvents for these reactions are above all water, alcohols, especially methanol, ethanol and isopropanol, ethylene glycol monomethyl ether, ethylene glycol monoethyl ether, dioxane, tetrahydrofurane, acetonitrile and mixtures of these solvents.

Since the manganous ion is easily oxidised, the reactions are advantageously carried out in an inert gas atmosphere which can consist, for example, of nitrogen.

Since the manufacturing processes described are equilibrium reactions, the compounds formed are frequently obtained as mixtures which in addition to the desired compounds of the formula I contain further compounds which are in equilibrium with these in the particular reaction medium.

Such mixtures obtained by the manufacturing processes described are also suitable for use as light stabilisers for polyamides.

The invention is explained in more detail in the examples which follow.

EXAMPLE 1

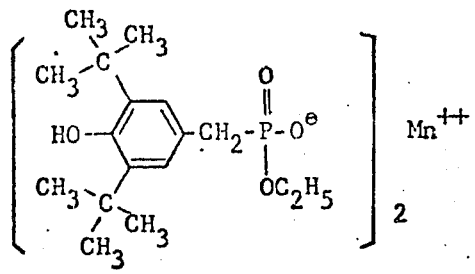

328 g (1 mol) of 3,5-di-tert.-butyl-4-hydroxy-benzylphosphonic acid monoethyl ester are suspended in 1,600 ml of water and neutralised with 10 N sodium hydroxide solution to a pH value of 6.5, whereupon the resulting sodium salt of the acid employed dissolves. A solution of 99 g (0.5 mol) of manganous chloride tetrahydrate in 200 ml of water is now added dropwise over the course of one hour at 30°C, with vigorous stirring. Hereupon, the manganous salt of the phosphonic acid half-ester mentioned separates out as a white precipitate. The suspension is stirred for half an hour at 30°C and the product is then filtered off and washed with water until no further chloride ions are detectable in the filtrate. The precipitate is dried at 80°C and a pressure of 11 mm for 16 hours.

As emerges from the analytical results listed below, the composition of the product corresponds to a manganous salt of the formula described above.

Calculated: C, 57.54; H, 7.95; P, 8.74; Mn, 7.74.
Found:     C, 57.57; H, 7.84; P, 8.62; Mn, 7.63.
The yield is 96% of theory.

If, instead of the 3,5-di-tert.-butyl-4-hydroxy-benzylphosphonic acid monoethyl ester, the monomethyl ester of this phosphonic acid, which can be manufactured in the same manner as the monoethyl ester, is used but in other respects the procedure described above is followed, the manganous salt of 3,5-di-tert.-butyl-4-hydroxy-benzylphosphonic acid monomethyl ester is obtained.

EXAMPLE 2

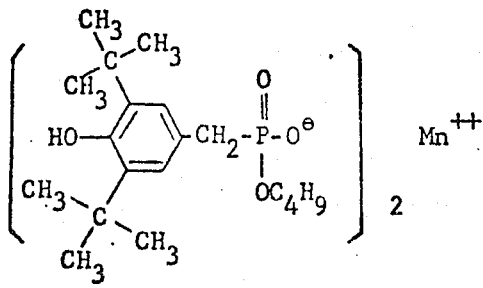

356.5 g (1 mol) of 3,5-di-tert.-butyl-4-hydroxy-benzylphosphonic acid mono-n-butyl ester are suspended in a mixture of 900 ml of ethanol and 1,500 ml of water and neutralised with 10 N sodium hydroxide solution to a pH value of 6.5, in the course of which the resulting sodium salt of the acid employed dissolves. A solution of 99 g (0.5 mol) of manganous chloride tetrahydrate in 200 ml of water is now added dropwise over the course of 1 hour at 25°C, with vigorous stirring. Hereupon, the manganous salt of the phosphonic acid half-ester mentioned separates out as a white precipitate. The suspension is stirred for half an hour at 25°C and the product is then filtered off and washed with 30% strength ethanol until no further chloride ions are detectable in the filtrate. The precipitate is dried at 80°C and a pressure of 11 mm for 16 hours.

As emerges from the analytical results listed below, the composition of the product corresponds to a manganous salt of the formula described above.

Calculated: C, 59.58; H, 8.42; P, 8.10; Mn, 7.17.

Found: C, 59.47; H, 8.40; P, 7.89; Mn, 7.18.
The yield is 96% of theory.

EXAMPLE 3

9.9 g of manganous chloride tetrahydrate (0.05 mol), dissolved in 100 ml of ethanol, are added dropwise over the course of 15 minutes to a solution of 57.5 g (0.1 mol) of sodium (O-n-octa-decyl-3,5-di-tert.-butyl-4-hydroxy-benzylphosphonate) in 150 ml of ethanol at 60°C. The suspension which hereupon forms is boiled for 30 minutes under reflux and then filtered, and the filtrate is evaporated to dryness in vacuo. The residue is extracted with 600 ml of hexane at 35°C and the extract is evaporated and dried at 40°C and a pressure of 11 mm. Manganous bis-(O-n-octadecyl-3,5-di-tert.-butyl-4-hydroxy-benzylphosphonate) is obtained as a fatty white product containing 5.3% of manganese.

EXAMPLE 4

On starting from 43.4 g (0.1 mol) of sodium (O-2-ethylhexyl-3,5-di-tert.-butyl-4-hydroxy-benzylphosphonate) but in other respects following the same procedure as described in Example 3, manganous bis-(O-2-ethylhexyl-3,5-di-tert.-butyl-4-hydroxy-benzylphosphonate) is obtained as a white solid containing 6.5% of manganese.

EXAMPLE 5

A solution of 9.9 g (0.05 mol) of manganous chloride tetrahydrate in 100 ml of absolute ethanol is added dropwise, over the course of 15 minutes, to a solution of 30.8 g (0.1 mol) of sodium (O-ethyl-3-methyl-5-tert.-butyl-4-hydroxy-benzylphosphonate) in 800 ml of absolute ethanol at 60°C. The suspension which hereupon forms is boiled for 30 minutes under reflux and filtered, and the filtrate is evaporated to dryness in vacuo. The residue is dried for 4 hours at 80°C and a pressure of 11 mm and is extracted with hot toluene, the solvent is evaporated from the extract in vacuo and the residue is dried for eight hours at 60°C and a pressure of 11 mm. Manganous bis-(O-ethyl-3-methyl-5-tert.-butyl-4-hydroxy-benzylphosphonate) is obtained as a white powder containing 8.2% of manganese.

The starting product of this example is prepared from 2-methyl-6-tert.-butyl-phenol in accordance with the process described in U.S. Pat. No. 3,310,575 (Example 1).

If instead of sodium (O-ethyl-3-methyl-5-tert.-butyl-4-hydroxy-benzylphosphonate), sodium (O-ethyl-3,5-di-isopropyl-4-hydroxy-benzylphosphonate), sodium (O-ethyl-3,5-di-sec.-butyl-4-hydroxy-benzylphosphonate) or sodium (O-ethyl-3,5-di-tert.-amyl-4-hydroxy-benzylphosphonate) is used, these being obtained from the corresponding phenols, chloromethylated in the 4-position, in accordance with the method described in U.S. Pat. No. 3,310,575 (Example 1), but in other respects the same procedure as in the above example is followed, manganous bis-(O-ethyl-3,5-di-iso-propyl-4-hydroxy-benzylphosphonate), manganous bis-(O-ethyl-3,5-di-sec.-butyl-4-hydroxy-benzylphosphonate) and manganous bis-(O-ethyl-3,5-di-tert.-amyl-4-hydroxy-benzyl-phosphonate) are respectively obtained.

EXAMPLE 6

24.4 g (0.1 mol) of 3,5-dimethyl-4-hydroxy-benzylphosphonic acid monoethyl ester together with 5.75 g (0.05 mol) of manganous carbonate are suspended in 500 ml of 50% strength ethanol and the mixture is heated under reflux, whilst stirring, until no further carbon dioxide is evolved. The precipitate which forms is filtered off, washed with 50% strength ethanol and dried for four hours at 70°C and a pressure of 11 mm. Hereupon, manganous bis-(O-ethyl-3,5-dimethyl-4-hydroxy-benzylphosphonate) is obtained as a sparingly soluble, pale rose-red product which contains 10.9% of manganese and 11.5% of phosphorus.

The starting product of this example can be manufactured as follows: 2,6-dimethylphenol is reacted with formaldehyde and dimethylamine in a known manner, the Mannich base formed is peralkylated with methyl iodide, and the quaternary ammonium salt is converted into 3,5-dimethyl-4-hydroxy-benzylphosphonic acid diethyl ester by means of triethyl phosphite, in accordance with the process described in U.S. Pat. No. 3,155,704. This ester is partially saponified with sodium hydroxide solution, as described in U.S. Pat. No. 3,310,575 (Example 1), to give the half-ester of melting point 140°C used as the starting product.

EXAMPLE 7

A solution of 19.8 g (0.1 mol) of manganous chloride tetrahydrate in 200 ml of absolute ethanol is added dropwise at 60°C to a solution of 35.0 g (0.1 mol) of sodium (O-ethyl-3.5-di-tert.-butyl-4-hydroxy-benzylphosphonate) in 90 ml of absolute ethanol. The reaction mixture is boiled for 30 minutes under reflux, the sodium chloride which precipitates is filtered off and the filtrate is evaporated to dryness in vacuo. The residue is extracted with 100 ml of chloroform at 25°C and the evaporated extract is dried at 80°C and a pressure of 11 mm for 6 hours.

The composition of the pale yellow-coloured product thereby obtained corresponds to that of manganous (O-ethyl-3,5-di-tert.-butyl-4-hydroxy-benzylphosphonate) monochloride, as emerges from the following analytical results:

Calculated: C, 48.85; H, 6.75; P, 7.42; Cl, 8.48; Mn, 13.15.
Found: C, 48.58; H, 6.80; P, 7.20; Cl, 8.71; Mn, 12.9.

EXAMPLE 8

A solution of 15 g (0.1 mol) of sodium iodide in 75 ml of absolute ethanol is added dropwise, at 25°C, to a solution of 41.8 g (0.1 mol) of manganous (O-ethyl-3,5-di-tert.-butyl-4-hydroxy-benzylphosphonate) monochloride in 210 ml of absolute ethanol. The reaction mixture is boiled for 30 minutes under reflux, the sodium chloride which separates out is filtered off and the filtrate is evaporated to dryness in vacuo. The dry residue is now extracted with ether and the extract is evaporated in vacuo and dried for 3 hours at 50°C and a pressure of 11 mm. Manganous (O-ethyl-3,5-di-tert.-butyl-4-hydroxy-benzylphosphonate) monoiodide is thus obtained as a solid yellow product containing 9.9% of manganese.

EXAMPLE 9

A solution of 32.8 g (0.1 mol) of 3,5-di-tert.-butyl-4-hydroxy-benzylphosphonic acid monoethyl ester in 150 ml of absolute ethanol, in which 17.3 g (0.1 mol) of anhydrous manganous acetate are suspended, is boiled for 6 hours under reflux and then filtered, and the filtrate is evaporated to dryness in vacuo. The residue is taken up 3 times with 100 ml of ethanol and again evaporated to dryness in vacuo. It is then washed with hexane and extracted with chloroform. After the evaporation of the solvent, a yellow-brown solid remains, containing manganous (O-ethyl-3,5-di-tert.-butyl-4-hydroxy-benzylphosphonate) monoacetate. Its manganese content is 12.1% (calculated 12.45%).

On starting from the same phosphonic acid half-ester but using anhydrous manganous formate instead of manganous acetate, though in other respects following the same procedure as in the example described above, manganous (O-ethyl-3,5-di-tert.-butyl-4-hydroxy-benzylphosphonate) monoformate is obtained.

EXAMPLE 10

A solution of 30.6 g (0.1 mol) of sodium stearate in 2 l of absolute methanol is added dropwise, at the boil, to a solution of 41.8 g (0.1 mol) of manganous (O-ethyl-3,5-di-tert.-butyl-4-hydroxy-benzylphosphonate) monochloride in 200 ml of absolute methanol. The reaction mixture is heated for two hours under reflux and is then allowed to cool slowly, and the resulting precipitate is filtered off. After evaporation of the filtrate, the residue is extracted with chloroform. The extract evaporated to dryness forms a beige residue which essentially consists of manganous (O-ethyl-3,5-di-tert.-butyl-4-hydroxy-benzylphosphonate) monostearate and contains 9.3% of manganese.

EXAMPLE 11

50 ppm of Mn were sprinkled dry, as the Mn phosphonate of Example 1 or Example 7, onto dried polyamide-6 granules delustred with 1.8% of $TiO_2$ (anatase), and the dry blend was spun by means of extruders into 20 den monofilaments which were subsequently stretched.

For the comparison formulation, the amount of manganous acetate corresponding to 50 ppm of Mn was dissolved in water and this solution was uniformly dried onto highly delustred polyamide-6 granules (1.8% of $TiO_2$). The dry blend was then again spun by means of extruders into 20 den monofilaments which were stretched.

As a further comparison, 20 den monofil silk free of Mn and delustred with 1.8% of $TiO_2$ was also manufactured.

These 3 silk formulations were exposed strain-free in a Xenotest-450 on a white cardboard background, and after 500, 1000, 1500 and 2000 hours' exposure time the mechanical strengths were determined. For the values obtained, see Table I.

Table I

| Additives | % residual strength after hours (hrs.) exposure time | | | |
|---|---|---|---|---|
| | 500 hrs. | 1000 hrs. | 1500 hrs. | 2000 hrs. |
| 1) Without Mn | 20% | — | — | — |
| 2) 50 ppm of Mn as Mn phosphonate from Example 1 | 90% | 80% | 75% | 70% |
| 3) 50 ppm of Mn as Mn phosphonate from Example 7 | 85% | 75% | 60% | 50% |
| 4) 50 ppm of Mn as manganous acetate | 80% | 65% | 40% | — |

EXAMPLE 12

50 ppm of Mn as Mn phosphonate of Example 1 were dissolved in a 60% strength AH-salt solution (adipic acid hexamethylenediamine salt) at 90°C. 0.15 mol % of acetic acid was added as a chain regulator and this solution was pumped into a stirred autoclave flushed with $N_2$. Thereafter the autoclave was heated to 260°C and kept at a pressure of 18 atmospheres gauge. Whilst retaining the pressure and the temperature, 2% by weight, relative to polyamide 6,6, of a 20% strength finely divided aqueous $TiO_2$ (anatase) dispersion were then pumped as a delustring agent into the autoclave, whilst stirring. In the final course of the condensation, the pressure was released from 18 to 0 atmospheres gauge over the course of 2 hours, the material temperature was raised to 275°C, and the system was flushed with purified $N_2$ for 1 hour. The finished polyamide 6,6 was extruded as spaghetti from the autoclave by means of $N_2$ pressure, cooled in a waterbath and granulated. The comparison polymers, without Mn and with 50 ppm of Mn as manganous acetate and manganous oxalate, were also manufactured in accordance with this instruction.

The dried granules were spun by means of an extruder at 295°C to give multifilaments of gauge 40/9 denier. The silks stretched in the usual manner on a stretched yarn machine were exposed strain-free, on a white cardboard background, in the Xenotest 450 in order to test the stability to light, and their mechanical strengths were determined after 500, 1000, 1500 and 2000 hours' exposure time. The values obtained are to be found in Table II.

Table II

| Additives | % residual strength after hours exposure time | | | |
|---|---|---|---|---|
| | 500 hrs. | 1000 hrs. | 1500 hrs. | 2000 hrs. |
| Without Mn | 35% | — | — | — |
| 50 ppm of Mn as Mn phosphonate from Example 1 | 90% | 80% | 75% | 60% |
| 50 ppm as manganous acetate | 85% | 65% | 55% | 40% |
| 50 ppm of Mn as manganous oxalate | 85% | 60% | 50% | 35% |

A light protection comparable with that of the Mn phosphonate from Example 1 is also achieved with the following compounds: manganous salt of 3,5-di-tert.-butyl-4-hydroxy-benzylphosphonic acid monomethyl ester, manganous salt of 3,5-di-tert.-butyl-4-hydroxy-benzylphosphonic acid mono-n-butyl ester, manganous salt of 3,5-di-tert.-butyl-4-hydroxy-benzylphosphonic acid mono-n-octadecyl ester, manganous salt of 3,5-di-tert.-butyl-4-hydroxy-benzylphosphonic acid mono-2-ethyl-hexyl ester, manganous salt of 3-methyl-5-tert.-butyl-4-hydroxy-benzylphosphonic acid monoethyl ester, manganous salt of 3,5-di-isopropyl-4-hydroxybenzylphosphonic acid monoethyl ester, manganous salt of 3,5-di-sec.-butyl-4-hydroxy-benzylphosphonic acid monoethyl ester, manganous salt of 3,5-di-tert.-amyl-4-hydroxy-benzylphosphonic acid monoethyl ester and manganous salt of 3,5-di-methyl-4-hydroxy-benzylphosphonic acid monoethyl ester.

EXAMPLE 13

Improved colour behaviour of Mn phosphonate in comparison to other Mn salts on thermal aftertreatment of nylon 6,6 filaments.

Knitted goods were produced from the fibre formulations described in Example 12 and were thermoset under the usual conditions in air for 1 minute at 210°C.

The reflection at 440 nm was measured on a spectrophotometer both for the untreated and for the thermoset knitted goods. The values obtained are to be found in Table III:

Table III

| Additives | % Reflection at 440 nm | |
| --- | --- | --- |
| | Untreated | Set for 1 min. at 210°C |
| 50 ppm of Mn as Mn phosphonate from Example 1 | 80% | 71% |
| 50 ppm of Mn as manganous acetate | 74% | 61% |
| 50 ppm of Mn as manganous oxalate | 78% | 65% |

We claim:

1. A synthetic polyamide composition stabilized against light deterioration with 1.0 to 500 parts per million of manganese relative to the polyamide, said manganese being in the form of a compound having the formula

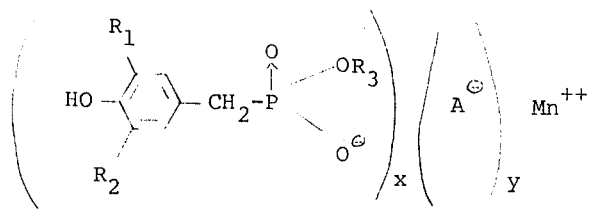

in which $R_1$ and $R_2$ independently of one another is alkyl with 1 to 8 carbon atoms, and $R_1$ and $R_2$ together contain not more than 12 carbon atoms, A is the anion of an aliphatic carboxylic acid with 1 to 18 carbon atoms or of an aromatic carboxylic acid with 7 to 11 carbon atoms or is the chloride, bromide or iodide anion, $x$ is 1 or 2, $y$ is 0 or 1, with $x + y$ being 2, and $R_3$ is alkyl with 1 to 18 carbon atoms.

2. A composition of claim 1 wherein $R_1$ and $R_2$ independently of one another is alkyl with 1 to 4 carbon atoms and A is the anion of acetic acid or stearic acid or the chloride or iodide anion.

3. A composition of claim 1 wherein $R_1$ and $R_2$ are methyl, iso-propyl, sec.-butyl or tert.-butyl, A is the anion of an aliphatic carboxylic acid with 2 to 8 carbon atoms, the anion of an aromatic carboxylic acid with 7 or 8 carbon atoms or the chloride, bromide or iodide anion and $R_3$ is methyl, ethyl, propyl, butyl or octyl.

4. A composition of claim 1 wherein $R_1$ and $R_2$ are tert.-butyl, A is the anion of acetic acid or benzoic acid, or the chloride, bromide or iodide anion and $R_3$ is methyl, ethyl or butyl.

5. A composition of claim 1 wherein the manganese compound is

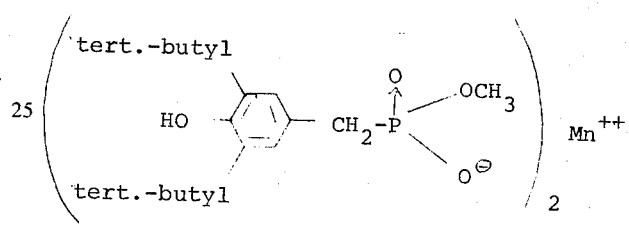

6. A composition of claim 1 wherein the manganese compound is

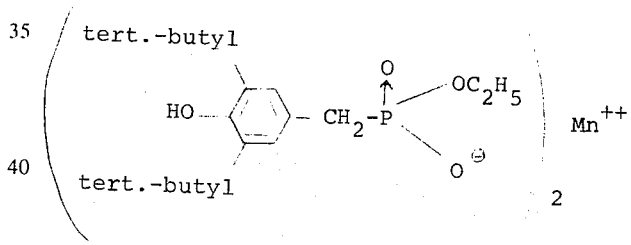

* * * * *